United States Patent
Bardalai et al.

(10) Patent No.: US 7,688,834 B2
(45) Date of Patent: Mar. 30, 2010

(54) SYSTEM AND METHOD FOR PROVIDING SUPPORT FOR MULTIPLE CONTROL CHANNELS

(75) Inventors: Snigdho Chandra Bardalai, Plano, TX (US); Stephen John Unger, Allen, TX (US)

(73) Assignee: Fujitsu Limited, Kawasaki (JP)

( * ) Notice: Subject to any disclaimer, the term of this patent is extended or adjusted under 35 U.S.C. 154(b) by 318 days.

(21) Appl. No.: 11/763,930

(22) Filed: Jun. 15, 2007

(65) Prior Publication Data

US 2008/0101413 A1    May 1, 2008

Related U.S. Application Data

(60) Provisional application No. 60/829,651, filed on Oct. 16, 2006.

(51) Int. Cl.
*H04L 12/28* (2006.01)
*H04L 12/56* (2006.01)
*H04L 12/40* (2006.01)

(52) U.S. Cl. .............. 370/395.52; 370/401; 370/438

(58) Field of Classification Search ............ 370/389, 370/438, 395.52, 401
See application file for complete search history.

(56) References Cited

U.S. PATENT DOCUMENTS

| | | | | |
|---|---|---|---|---|
| 5,646,936 | A | 7/1997 | Shah et al. | 370/228 |
| 5,859,959 | A | 1/1999 | Kimball et al. | 395/182.02 |
| 6,701,448 | B1 | 3/2004 | Akyol et al. | 714/4 |
| 6,718,387 | B1 * | 4/2004 | Gupta et al. | 709/226 |
| 6,738,624 | B1 | 5/2004 | Aksentijevic et al. | 455/452.1 |
| 7,174,387 | B1 | 2/2007 | Shand et al. | 709/238 |
| 7,269,132 | B1 | 9/2007 | Casey et al. | 370/219 |
| 2003/0137932 | A1 | 7/2003 | Nishioka et al. | 370/216 |
| 2004/0015590 | A1 | 1/2004 | Nagami et al. | 709/227 |
| 2004/0057724 | A1 | 3/2004 | Oksanen et al. | 398/5 |
| 2004/0120705 | A1 | 6/2004 | Friskney et al. | 398/5 |
| 2005/0089027 | A1 * | 4/2005 | Colton | 370/380 |
| 2006/0092932 | A1 | 5/2006 | Ghosh et al. | 370/389 |
| 2007/0198710 | A1 * | 8/2007 | Gopalakrishnan | 709/225 |
| 2008/0008168 | A1 * | 1/2008 | Nadeau et al. | 370/389 |
| 2008/0107415 | A1 | 5/2008 | Bardalai | 398/58 |
| 2008/0112322 | A1 | 5/2008 | Bardalai | 370/235 |
| 2008/0170857 | A1 | 7/2008 | Bardalai | 398/59 |
| 2008/0219156 | A1 | 9/2008 | Caviglia et al. | 370/228 |

OTHER PUBLICATIONS

Ohuchi, et al., Metro SONET System Supporting Optical Backbone Infrastructure: FLASHWAVE 4500, *FUJITSU Sci. Tech. J.*, 42,4, p. 454-459 (Oct. 2006).
*SONET Telecommunications Standard Primer*, www.tektronix.com/optical.

(Continued)

*Primary Examiner*—Alpus H Hsu
*Assistant Examiner*—Saad Hassan
(74) *Attorney, Agent, or Firm*—Baker Botts L.L.P.

(57) ABSTRACT

A method for providing support for multiple control channels includes establishing an indirect data connection with a first network entity in an optical network. The method also includes establishing a first control channel with the first network entity. The first control channel has at least one unique source IP address. The method additionally includes transmitting a first control message to the first network entity via the first control channel. The first control message comprises a first unique source IP address.

16 Claims, 2 Drawing Sheets

OTHER PUBLICATIONS

Berger, L., Editor, Editor, *Generalized Multi-Protocol Label Switching (GMPLS) Signaling Resources ReserVation Protocol-Traffic Engineering (RSVP-TE) Extensions*; Movaz Networks, Jan. 2003. Network Working Group, Request for Comments: 3473, Category: Standards Track.

Lang, J., *Link Management Protocol (LMP)*, Sonos, Inc., Oct. 2005. Network Working Group, Request for Comments: 4204, Category: Standards Track.

Bardalai, *System and Method for Discovering Neighboring Nodes*, U.S. Appl. No. 11/764,507, filed Jun. 18, 2007.

Bardalai, *System and Method for Rejecting a Request to Alter a Connection*, U.S. Appl. No. 11/764,525, filed Jun. 18, 2007.

Bardalai, *System and Method for Establishing Protected Connections*, U.S. Appl. No. 11/852,580, filed Sep. 10, 2007.

* cited by examiner

SYSTEM AND METHOD FOR PROVIDING SUPPORT FOR MULTIPLE CONTROL CHANNELS

CROSS-REFERENCE TO RELATED APPLICATIONS

This application claims the benefit of priority under 35 U.S.C. §119(e) of U.S. Provisional Application Ser. No. 60/829,651 filed Oct. 16, 2006.

TECHNICAL FIELD

This invention relates generally to the field of communication networks and more specifically to a system and method for providing support for multiple control channels.

BACKGROUND

An optical network uses optical signals to communicate information among the nodes of the network. This information often includes both data (e.g., a file that is being downloaded, packets carrying voices of a phone call, or the contents of a webpage) and signaling (e.g., commands or messages between nodes containing status or setup information). In some optical networks the data may be transferred using a data channel (e.g., a datalink) while the signaling is communicated using a control channel. In such an instance the control channel may be said to be out-of-band; that is the control channel is separate from the data channel. In some situations, such as in an optical network comprising several nodes, it may be desirable for a node to have multiple control channels. However, some protocols, such as the Link Management Protocol (LMP), have limited control in managing multiple control channels over a single physical interface.

Generic multi-protocol label switching requires out-of-band control channels in order to be able to control a non-IP based network element such as an optical network element. LMP maintains control channels which can be identified as a pair of unique IP addresses. Furthermore, LMP requires multiple or redundant control channels between two nodes for resiliency. However, LMP does not support multiple control channels between two indirectly connected nodes. One solution is to create generic routing encapsulation, or IP-in-IP tunnels, in order to achieve logical separation between a data channel and a control channel. However, this often requires universal support of the tunneling feature.

SUMMARY OF THE DISCLOSURE

Particular embodiments provide a system and method for providing support for multiple control channels that substantially eliminates or reduces at least some of the disadvantages and problems associated with previous methods and systems.

In accordance with a particular embodiment, a method for providing support for multiple control channels includes establishing an indirect data connection with a first network entity in an optical network. The method also includes establishing a first control channel with the first network entity. The first control channel has at least one unique source IP address associated therewith. The method additionally includes transmitting a first control message to the first network entity via the first control channel. The first control message includes a first unique source IP address associated with the first control channel.

In some embodiments the method may also include establishing a direct data connection with a second network entity. The second network entity may be positioned such that the first control message passes through the second network entity before arriving at the first network entity. The method may also include establishing a second control channel with the second network entity. The second control channel comprises at least one unique source IP address associated with the second control channel, the at least one unique source IP address associated with the second control channel different than the at least one unique source IP address associated with the first control channel.

In some embodiments, the method may further include receiving a second control message from the first network entity. The second control message may include a second unique source IP address associated with the first control channel. The method may also include receiving a link management protocol message from the first network entity. The link management protocol message may be demultiplexed using the second unique source IP address.

In accordance with another embodiment a system for providing support for multiple control channels includes a processor operable to establish an indirect data connection with a first network entity in an optical network. The processor is also operable to establish a first control channel with the first network entity. The first control channel comprises at least two unique source IP addresses. The system also includes an interface coupled to the processor. The interface is operable to transmit a first control message to the first network entity via the first control channel. The first control message comprises a first unique source IP address.

Technical advantages of particular embodiments include establishing control channels between indirectly coupled network entities using unique source IP addresses. Accordingly, a remote network entity may be able to determine the proper control channel associated with a control message received from a network entity to which it is indirectly coupled.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of particular embodiments and their features and advantages, reference is now made to the following description, taken in conjunction with the accompanying drawings, in which.

DETAILED DESCRIPTION OF THE DRAWINGS

Figure 1:
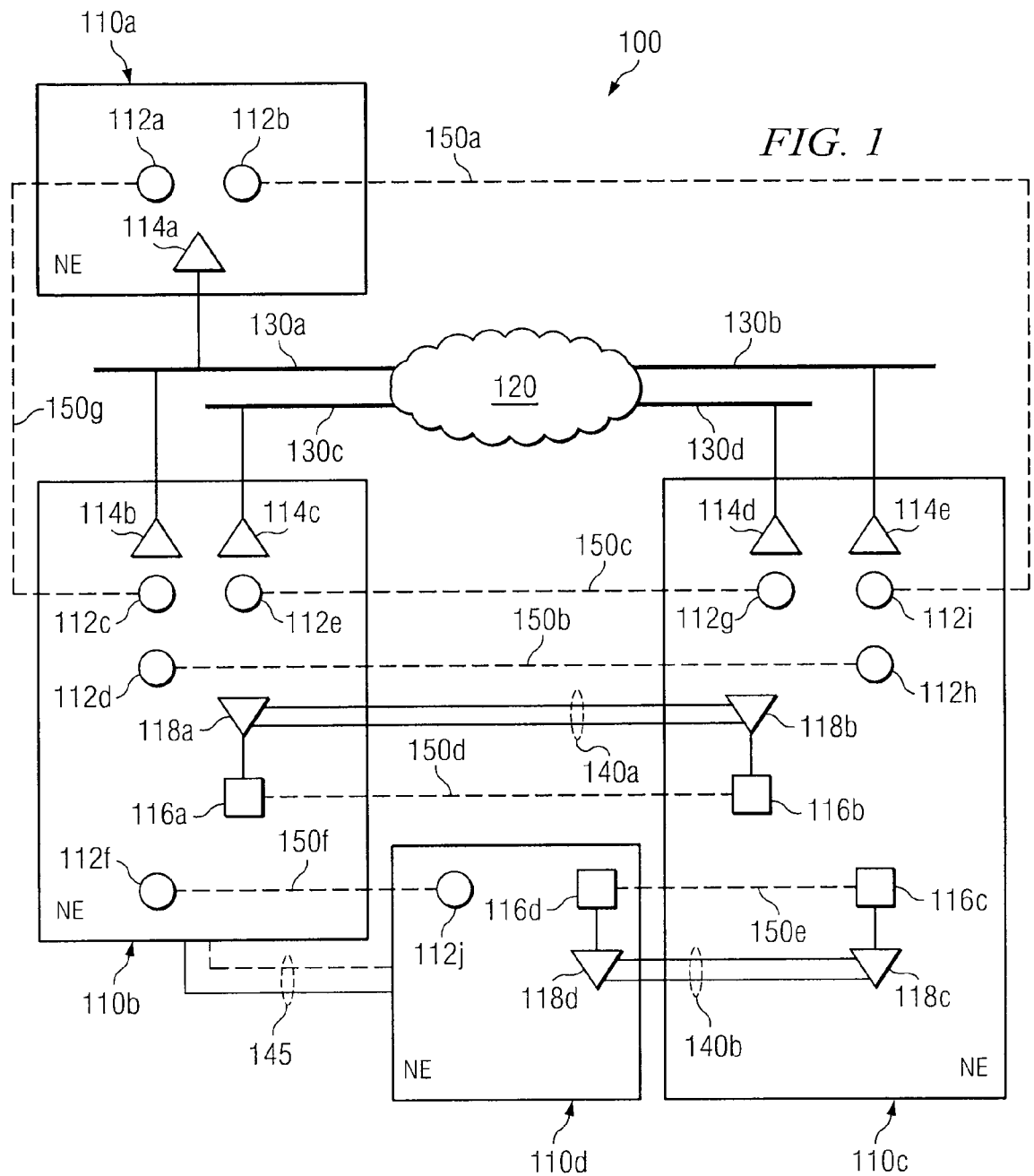
FIG. 1 is a block diagram illustrating an example embodiment of a network system that provides support for multiple control channels.

FIG. 1 is a block diagram illustrating an example embodiment of a network system that provides support for multiple control channels. According to the illustrated embodiment, network system 100 includes four network entities 110 physically coupled to one another via direct datalinks 140 and broadcast network lines 130 and logically coupled to one another via direct datalinks 140, indirect datalink 145, and control channels 150. A network entity may include both direct and indirect connections with other network entities. For example, network entity 110b is directly connected to network entity 110c via direct datalink 140a, and network entity 110b is indirectly connected to network entity 110d via indirect datalink 145. An indirect connection may include, among other things, an out-of-fiber connection and a direct connection may include, among other things, an in-fiber connection. Network entities 110 communicate data, such as files or webpages, between one another using direct datalinks 140, indirect datalinks 145 and/or broadcast network lines 130. Network entities 110 also communicate control messages, such as routing, signaling and/or link management messages, between each other using control channels 150. While FIG. 1 depicts control channels 150 as being separate from direct datalinks 140 and broadcast network lines 130, it should be noted that control messages may be transmitted over the physical medium represented by datalinks 140 and broadcast network lines 130. For example, the same optical fiber that carries the data may also carry a control message. Furthermore, each physical medium may terminate at a network entity 110 at an interface. More specifically, point-to-point interfaces 118 may be used with direct datalinks 140 and broadcast interfaces 114 may be used with broadcast network lines 130.

In certain instances it may be desirable for a network entity to establish a control channel with another network entity to which the first network entity is not directly connected. This may allow the network entities to be able to establish a logical connection and to configure certain parameters/features for use in transferring data between one another. However, in some optical networks this may not be possible for network entities that are not directly connected to one another (e.g., in an optical network that does not support indirect control channels). According to particular embodiments, a network entity may associate a unique source IP address with each of its control channels. Thus, each control message sent over a particular control channel may include the respective unique source IP address. FIG. 1 includes both direct IP addresses 116, for directly connected network entities 110, and indirect IP addresses 112, for indirectly connected network entities 110. For example, network entity 110d, utilizing control channels 150e and 150f, uses indirect IP address 112j for control messages sent via control channel 150f and direct IP address 116d for control messages sent via control channel 150e. Thus, network entity 110d may be able to establish control channel 150f with network entity 110b (to which network entity 110b is indirectly coupled-network entity 110c is between network entity 110b and 110d) and network entity 110b may be able to determine that the control message is from network entity 110d because the control message may include indirect IP address 112j.

The use of a unique source IP address for each control channel may also allow a network entity to be able to determine from which interface a message came. For example, if network entity 110c were to receive a control message from network entity 110b, network entity 110c may not know whether the control message came from broadcast interface 114b or 114c. However, by including indirect IP address 112e, network entity 110c may be able to determine that the control message originated from broadcast interface 114c and thus is from control channel 150c.

Network 100 may be any type of network employing any suitable topology, such as a ring network, a star network, a bus network, a mesh network, or any other type of network that may be desired. For example, if network 100 was a ring network it may use a unidirectional path-switched ring (UPSR) topology or a bidirectional line switched ring (BLSR) topology. Furthermore, network 100 may utilize protocols such as Resilient Packet Ring (RPR) protocols. An RPR protocol may refer to a protocol for ring-based packet transport, where packets are added, passed through, or dropped at each node (e.g. network entity 110c). According to some embodiments, network 100 may utilize any suitable transmission technique, such as Ethernet, Synchronous Optical Network (SONET), or wavelength division multiplexing (WDM) techniques (e.g. dense wavelength division multiplexing (DWDM)). In addition, network 100 may employ a synchronous transport signal (STS). In some embodiments, network 100 may communicate information in packets. A packet may comprise a bundle of data organized in a specific way for transmission. A packet may carry any suitable information such as voice, data, audio, video, multimedia, control, signaling, other information, or any combination of the preceding. The packets may comprise any suitable multiplexed packets, such as time division multiplexed (TDM) packets. One or more packets may be organized within a frame in a specific way for transmission.

Packets or frames may be communicated within portions of network 100 using an optical signal transmitted as light pulses. As an example, an optical signal may have a frequency of approximately 1550 nanometers and a data rate of 10, 20, 40, or over 40 gigabits per second. These light pulses may travel through any type of fiber suitable to transmit a signal. According to one embodiment, the fiber may include an optical fiber. An optical fiber typically comprises a cable made of silica glass or plastic. The cable may have an outer cladding material around an inner core. The inner core may have a slightly higher index of refraction than the outer cladding material. The refractive characteristics of the fiber operate to retain a light signal inside of the fiber.

Within network 100 is intermediary network 120. Intermediary network 120 may comprise any number, size and type of network. These networks may include any network capable of transmitting signals, data and/or messages. Any one of the networks that comprise intermediary network 120 may be implemented as a local area network (LAN), a wide area network (WAN), a cellular network, a global distributed network such as the Internet, an Intranet, an Extranet, a radio network (RN), a CDMA network, a GSM network, a TDMA network, a satellite network or any other form of wireless or wireline networking.

Network entities 110 may include any suitable type of networking device such as a node, a cross connect, a database, a regenerating unit, dense wavelength division multiplexers (DWDMs), access gateways, endpoints, softswitch servers, trunk gateways, access service providers, Internet service providers, or any other device operable to route packets to, from or within network 100.

Each network entity 110 may include any suitable arrangement of components operable to perform the operations of that type of network entity. As an example, network entity 110a may include logic, an interface, a processor, memory, other components, or any suitable combination of the preceding. Logic may include hardware, software, other logic, or any suitable combination of the preceding. Certain logic may manage the operation of a device, and may comprise, for example, a processor. A processor may include any suitable device operable to execute instructions and manipulate data to perform operations. An interface may include logic of a device operable to receive input for the device, send output from the device, perform suitable processing of the input or output or both, or any combination of the preceding, and may comprise one or more ports, conversion software, or both. Memory may include logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

In the illustrated embodiment broadcast network lines 130 represent physical connections between network entities 110, indirect datalink 145 and control channels 150 represent logical connections between network entities, and direct datalinks 140 represent both physical and logical connections between network entities. More specifically, even though two network entities may have established a pairing (e.g., network entities 110a and 110c have established control channel 150a), any data/messages transmitted between the paired network entities would travel along broadcast network lines 130 or direct datalinks 140. For example, even though network entities 110b and 110d have established a logical connection as represented by indirect datalink 145, data sent between network entities 110b and 110d travels along the fiber used for direct datalink 140a and 140b. In some embodiments direct datalink 140 may comprise a datalink with in-fiber-out-of-band IP transport, while indirect datalink 145 may comprise a datalink without in-fiber-out-of-band IP transport.

As depicted in FIG. 1, each network entity 110 is connected, either directly or indirectly, with several other network entities. In a traditional optical network using Link Management Protocol (LMP), the LMP standard only supports control channels between those network entities that are directly connected to one another. More specifically, the LMP standard supports direct control channels (e.g. control channels 150d and 150e) for datalinks with in-fiber-out-of-band IP transport (e.g., direct datalinks 140a and 140b). Accordingly, when network entity 110d receives a control message from network entity 110b, network entity 110d does not know that the control message was originally from network entity 110b because they are not directly connected and thus do not have a direct control channel between them. As may be apparent a similar problem occurs between network entities connected through broadcast network lines 130. More specifically, a network entity connected via broadcast network lines 130 may not know which interface a control message came from, and thus may not know to which control channel it corresponds. For example, if network entity 110c receives a control message from network entity 110b via broadcast interface 114e, it may not know whether the control message was from broadcast interface 114b or 114c.

According to some embodiments, a unique source IP address may be created for each interface of each control channel. Thus, a network entity with multiple control channels and multiple interfaces will similarly have multiple source IP addresses. This may allow the receiving network entity to be able to identify the source of the control message and thus to which control channel the control message corresponds. This may be desirable where two network entities, such as network entities 110b and 110c, have established several different control channels, such as control channels 150b, 150c and 150d, between each other and where both network entities have several interfaces (e.g., network entity 110b has broadcast interfaces 114d and 114e, and point-to-point interfaces 118b and 118c) from which they may send/receive data and/or control messages. Because of the plurality of interfaces and control channels, the receiving network entity may not be able to identify the source of the control message without the unique IP address.

By providing each control channel 150 with its own unique source IP address it may be possible to establish a control channel between interfaces of network entities that are not directly coupled to one another. For example, by using IP address 112f associated with interface 118a, network entity 110d may receive a control message via interface 118d and know, based on the source IP address being IP address 112f that the control message came from network entity 110b, not network entity 110c. Accordingly, control channel 150f may be established, even though network entities 110b and 110d are not directly coupled to one another.

Similarly, in the situation in which network entities are only connected via broadcast network lines 130, interface 114b may use indirect IP address 112c for control messages sent to network entity 110a. Indirect IP address 112c may be unique to control channel 150g so that network entity 110a may be able to determine the appropriate control channel (and thus the corresponding interface and network entity) associated with any control messages sent with the indirect IP address 112, regardless of the path the message takes.

Modifications, additions, or omissions may be made to network 100 without departing from the scope of the invention. The components of network 100 may be integrated or separated according to particular needs. Moreover, the operations of network 100 may be performed by more, fewer, or other devices. Additionally, operations of network 100 may be performed using any suitable logic. As used in this document, "each" refers to each member of a set or each member of a subset of a set.

Figure 2:
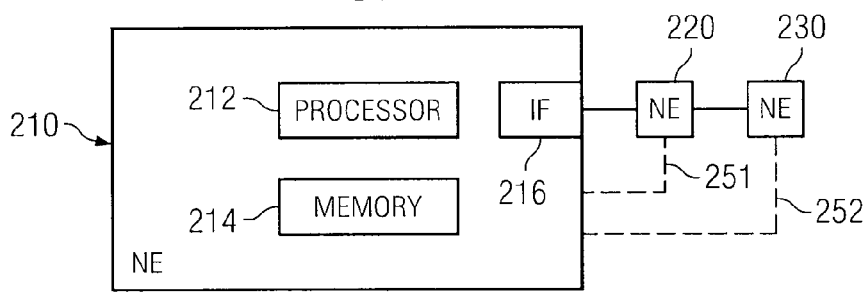
FIG. 2 is a block diagram illustrating an example embodiment of a network entity comprising a direct control channel and an indirect control channel.

FIG. 2 is a block diagram illustrating an example embodiment of a network entity comprising a direct control channel and an indirect control channel. Direct control channel 251 is between directly connected network entities 210 and 220; indirect control channel 252 is between indirectly connected network entities 210 and 230. For simplicity, only network entity 210's internal components have been depicted. In other embodiments, network entity 210 may comprise more or fewer internal components, and one or more of the components may be external to network entity 210. Though not depicted, network entities 220 and 230 may comprise similar components. Network entities 210, 220, and 230 may be any type of network entity including any of the network entities mentioned above with respect to FIG. 1.

Processor 212 may be a microprocessor, controller, or any other suitable computing device, resource, or combination of hardware, software and/or encoded logic operable to provide, either alone or in conjunction with other network entity 210 components such as memory 214 and interface 216, network entity functionality. Such functionality may include providing various features discussed herein to a network, such as network 100 depicted in FIG. 1. Such features may include establishing both direct and indirect control channels with other network entities within the network. Each of these control channels may have associated therewith a unique source IP address. This unique source IP address may be included in any control messages sent via the respective control channel.

Memory 214 may be any form of volatile or non-volatile memory including, without limitation, magnetic media, optical media, random access memory (RAM), read-only memory (ROM), removable media, or any other suitable local or remote memory component. Memory 214 may store any suitable instructions, data or information, including software and encoded logic, utilized by network entity 210. For example, in some embodiments memory 214 may store any information, data, commands or instructions needed by processor 212 to establish and maintain multiple control channels with different network entities. Such data may include a table, chart or other organization of data that matches unique source IP addresses with control channels. For example, memory 214 may store an interface IFINDEX that comprises a unique number within network entity 210 identifying the interface. This number may be assigned during the setup of the interface itself.

Interface 216 may be used in the communication of signaling and/or data between network entity 210 and other network entities, such as network entities 220 and 230. For example, network entity 210 may receive a control message from network entity 230 via interface 216. The number and type of interfaces 216 included with network entity 210 may be based on the number and type of networks to which network entity 210 is coupled. For example, network entity 210 may be coupled to an optical network and a broadcast network. In such a situation interface 216 may comprise a point-to-point optical interface and a broadcast network interface.

The following example is intended to help illustrate how the internal components of network entity 210 may be used in connection with several control channels having unique source IP addresses. As depicted, network entity 210 is directly coupled to network entity 220 and indirectly coupled to network entity 230. Accordingly, network entity 210 uses direct control channel 251 to send control messages to network entity 220 and indirect control channel 252 to send control messages to network entity 230. During the establishment of control channels 251 and 252 processor 212 may have associated a unique source IP address with each control channel. In doing so processor 212 may have employed an interface IFINDEX stored within memory 214 to determine whether the unique source IP address to be used for control channels 251 and 252 was in fact unique (e.g., not being used for any other control channels for any other network entity). In particular embodiments, the source IP address associated with a control message sent from network entity 230 via control channel 252 is different than the source IP address associated with a control messages sent from network entity 210 via control channel 252.

When network entity 210 wants to transmit a control message to either network entity 220 or 230, processor 212 may generate the control message and include the unique source IP address associated with the respective control channel within the Config Message IP header of the control message. For example, if network entity 210 wants to send a control message to network entity 230, processor 212 may include the unique source IP address associated with control channel 252 in the Config Message IP header of the control message.

While network entity 210 may have originally sent the control message, network entity 230 may actually receive the control message from network entity 220 (network entity 230 is directly connected to network entity 220). However, because the control message included the unique source IP address associated with control channel 252 network entity 230 may be able to determine that the control message relates to control channel 252 and network entity 230's connection with network entity 210.

Similarly, network entity 210 may receive control messages from network entities 220 and 230. These control messages would have their own unique source IP address. Upon receiving the control message via interface 216, processor 210 may attempt to match a control channel that has a provisioned source IP address matching the source IP address of the received control message. Processor 212 may search memory 214 to determine if there is a match. If processor 212 is able to match the source IP address then it knows the associated control channel and which network entity sent the control message. Processor 212 may then use the unique source IP address to demultiplex the LMP messages.

If processor 212 is not able to find a match within memory 214 then it may select the control channel bound to the received interface that does not have any values set for the remote IP address.

Figure 3:
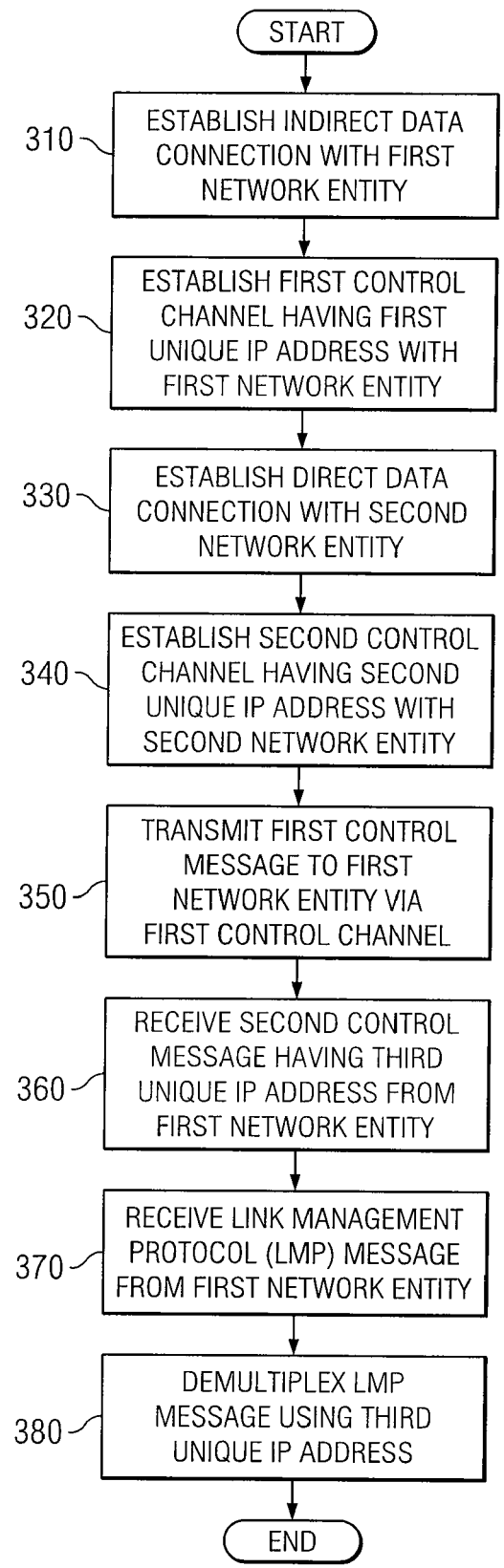
FIG. 3 is a flowchart illustrating an example embodiment of a method of providing support for multiple control channels that may be used with the network system of FIG. 1.

FIG. 3 is a flowchart illustrating an example embodiment of a method of providing support for multiple control channels that may be used with the network system of FIG. 1. For simplicity, the method depicts some of the steps taken by a local network entity using multiple control channels. Furthermore, Link Management Protocol (LMP) may be used in establishing any direct or indirect data connections and any control channels.

The method begins at step 310 where the local network entity establishes an indirect data connection with a first network entity. The data connection may be indirect because there may be at least one node or network entity between the local and first network entities. A network entity or node may comprise any suitable type of networking device such as a cross connect, a database, a regenerating unit, a dense wavelength division multiplexer (DWDM), an access gateway, an endpoint, a softswitch server, a trunk gateway, an access service provider, an Internet service provider, or any other device operable to route packets to, from or between other network entities or nodes.

At step 320 the local network entity establishes a first control channel, having a first unique IP address, with the first network entity. The first control channel may be used to send and receive control messages between the two network entities. The local network entity may include the first unique IP address in any control messages it sends via the first control channel. Similarly, the first network entity may also have its own unique IP address that it may include in any control messages it sends via the first control channel. Thus, the first control channel may have two different IP addresses associated therewith; one unique IP address for each network entity.

At step 330 the local network entity establishes a direct data connection with a second network entity. The data connection may be direct because there may not be any intermediary network entities or nodes between the local and second network entity. For example, in some embodiments the local and second network entities may be directly coupled to one another via a continuous optical fiber.

At step 340 the local network entity establishes a second control channel, having a second unique IP address, with the second network entity. The local network entity may include the second unique IP address in any control messages it sends via the second control channel. The second network entity may also have a unique IP address that it may include in any control messages that it sends via the second control channel. The two unique IP addresses used with the second control channel may be different than the two unique IP addresses used with the first control channel. Thus, the first network entity may use two different IP addresses depending on which network entity is to receive the control message.

At step 350 the local network entity transmits a first control message to the first network entity via the first control channel. In doing so the local network entity may include the first unique IP address in the control message. For example, in some embodiments the local network entity may include the first unique IP address in the Config message IP header of the control message.

At step 360 the local network entity may receive a second control message, including a third unique IP address, from the first network entity. The third unique IP address may be associated with the first control channel. Because the local and first network entities are not directly connected, the second control message may pass through other nodes or network entities. In some embodiments, the second control message may pass through the second network entity before arriving at the local network entity. However, because the first network entity included the third unique IP address with the control message, the local network entity may be able to determine that the control message is from the first network entity, and not the network entity from which the control message was physically received.

At step 370 the local network entity receives an LMP message from the first network entity. The LMP message may be received via the indirect data connection. Then at step 380 the local network entity may demultiplex the LMP message from the first network using the third unique IP address received via the first control channel.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for providing support for multiple control channels, comprising:
   establishing an indirect data connection with a first network entity in an optical network using a broadcast interface;
   establishing a first control channel with the first network entity using the broadcast interface, the first control channel comprising at least one unique source IP address associated with the first control channel; and
   transmitting a first control message to the first network entity via the first control channel, the first control message comprising the unique source IP address associated with the first control channel;
   establishing a direct data connection with a second network entity using the broadcast interface, the second network entity positioned such that the first control message passes through the second network entity before arriving at the first network entity;
   establishing a second control channel with the second network entity using the broadcast interface, the second control channel comprising at least one unique source IP address associated with the second control channel, the at least one unique source IP address associated with the second control channel different than the at least one unique source IP address associated with the first control channel such that the unique source IP address distinguishes control message in different control channels received over the same broadcast interface; and
   transmitting a second control message to the second network entity via the second control channel, the second control message comprising the unique source IP address associated with the second control channel.

2. The method of claim 1, wherein the first unique source IP address is in a Config message IP header of the first control message.

3. The method of claim 1, wherein establishing an indirect data connection with a first network entity in an optical network comprises establishing an indirect data connection with a first network entity in an optical network using link management protocol.

4. The method of claim 1, further comprising:
   receiving a third control message from the first network entity, the third control message comprising a second unique source IP address associated with the first control channel;
   receiving a link management protocol message from the first network entity; and
   demultiplexing the link management protocol message using the second unique source IP address.

5. The method of claim 1, further comprising receiving an interface IFINDEX comprising a correlation between the first control channel and the unique source IP address.

6. A system for providing support for multiple control channels, comprising:
   a processor operable to:
      establish an indirect data connection with a first network entity in an optical network using a broadcast interface; and
      establish a first control channel with the first network entity using the broadcast interface, the first control channel comprising at least one unique source IP address associated with the first control channel;
      establish a direct data connection with a second network entity using the broadcast interface, the second network entity positioned such that the first control message passes through the second network entity before arriving at the first network entity; and
      establish a second control channel with the second network entity using the broadcast interface, the second control channel comprising at least one unique source IP address associated with the second control channel, the at least one unique source IP address associated with the second control channel different than the at least one unique source IP address associated with the first control channel such that the unique source IP address distinguishes control message in different control channels received over the same broadcast interface; and
   an interface coupled to the processor and operable to transmit a first control message to the first network entity via the first control channel and transmit a second control message to the second network entity via the second control channel, the first control message comprising the unique source IP address associated with the first control channel and the second control message comprising the unique source IP address associated with the second control channel.

7. The system of claim 6, wherein the first unique source IP address is in a Config message IP header of the first control message.

8. The system of claim 6, wherein the processor operable to establish an indirect data connection with a first network entity in an optical network comprises a processor operable to establish an indirect data connection with a first network entity in an optical network using link management protocol.

9. The system of claim 6, wherein:
   the interface is further operable to:
      receive a third control message from the first network entity, the third control message comprising a second unique source IP address associated with the first control channel; and
      receive a link management protocol message from the first network entity; and
   the processor is further operable to demultiplex the link management protocol message using the second unique source IP address.

10. The system of claim 6, wherein the interface is further operable to receive an interface IFINDEX comprising a correlation between the first control channel and the unique source IP address.

11. A computer readable medium comprising code operable, when executed by a processor, to:
 establish an indirect data connection with a first network entity in an optical network using a broadcast interface;
 establish a first control channel with the first network entity using the broadcast interface, the first control channel comprising at least one unique source IP address associated with the first control channel; and
 transmit a first control message to the first network entity via the first control channel, the first control message comprising the unique source IP address associated with the first control channel;
 establish a direct data connection with a second network entity using the broadcast interface, the second network entity positioned such that the first control message passes through the second network entity before arriving at the first network entity;
 establish a second control channel with the second network entity using the broadcast interface, the second control channel comprising at least one unique source IP address associated with the second control channel, the at least one unique source IP address associated with the second control channel different than the at least one unique source IP address associated with the first control channel such that the unique source IP address distinguishes control message in different control channels received over the same broadcast interface; and
 transmitting a second control message to the second network entity via the second control channel, the second control message comprising the unique source IP address associated with the second control channel.

12. The computer readable medium of claim 11, wherein the first unique source IP address is in a Config message IP header of the first control message.

13. The computer readable medium of claim 11, wherein the code operable to establish an indirect data connection with a first network entity in an optical network comprises code operable to establish an indirect data connection with a first network entity in an optical network using link management protocol.

14. The computer readable medium of claim 11, wherein the code is further operable to:
 receive a third control message from the first network entity, the third control message comprising a second unique source IP address associated with the first control channel;
 receive a link management protocol message from the first network entity; and
 demultiplex the link management protocol message using the second unique source IP address.

15. The computer readable medium of claim 11, wherein the code is further operable to receive an interface IFINDEX comprising a correlation between the first control channel and the unique source IP address.

16. A system for providing support for multiple control channels, comprising:
 means for establishing an indirect data connection with a first network entity in an optical network using a broadcast interface;
 means for establishing a first control channel with the first network entity using the broadcast interface, the first control channel comprising at least one unique source IP address associated with the first control channel;
 means for transmitting a first control message to the first network entity via the first control channel, the first control message comprising a first unique source IP address associated with the first control channel;
 means for establishing a direct data connection with a second network entity using the broadcast interface, the second network entity positioned such that the first control message passes through the second network entity before arriving at the first network entity;
 means for establishing a second control channel with the second network entity using the broadcast interface, the second control channel comprising at least one unique source IP address associated with the second control channel, the at least one unique source IP address associated with the second control channel different than the at least one unique source IP address associated with the first control channel such that the unique source IP address distinguishes control message in different control channels received over the same broadcast interface; and
 means for transmitting a second control message to the second network entity via the second control channel, the second control message comprising the unique source IP address associated with the second control channel.

* * * * *